United States Patent
Zumbrunnen (10) Patent No.: US 7,858,677 B2
(45) Date of Patent: Dec. 28, 2010

(54) COMPOSITES WITH ORIENTED PARTICLES AND PARTICLE NETWORKS

(75) Inventor: David A Zumbrunnen, Seneca, SC (US)

(73) Assignee: Clemson University, Clemson, SC (US)

( * ) Notice: Subject to any disclaimer, the term of this patent is extended or adjusted under 35 U.S.C. 154(b) by 182 days.

(21) Appl. No.: 11/973,420

(22) Filed: Oct. 9, 2007

(65) Prior Publication Data

US 2008/0262125 A1 Oct. 23, 2008

Related U.S. Application Data

(63) Continuation-in-part of application No. 10/956,753, filed on Oct. 1, 2004, now abandoned.

(60) Provisional application No. 60/508,708, filed on Oct. 3, 2003.

(51) Int. Cl.
*C09K 9/04* (2006.01)

(52) U.S. Cl. ............... 523/351; 524/445; 524/430; 524/495; 524/543

(58) Field of Classification Search ............... 523/351; 524/445, 430, 495, 543
See application file for complete search history.

(56) References Cited

U.S. PATENT DOCUMENTS

| 6,384,121 | B1 * | 5/2002 | Barbee et al. ............... 524/445 |
| 6,617,020 | B2 * | 9/2003 | Zhou et al. ............... 428/355 R |
| 6,770,340 | B2 | 8/2004 | Zumbrunnen et al. |
| 6,902,805 | B2 | 6/2005 | Zumbrunnen et al. |
| 7,377,684 | B2 | 5/2008 | Zumbrunnen |
| 2005/0113503 | A1 | 5/2005 | Zumbrunnen |
| 2007/0135553 | A1 | 6/2007 | Zumbrunnen |

* cited by examiner

*Primary Examiner*—Robert D. Harlan
(74) *Attorney, Agent, or Firm*—J. M. Robertson, LLC (57) ABSTRACT

A composite comprising a first melt processable material referred to as a masterbatch which includes particulate material master batch and a second melt-processable material said first melt processable material and said second melt processable material are formed into a multilayer arrangement by chaotic advection and wherein said particulate material is oriented within layers, or forms networks in said first melt-processable material.

11 Claims, 8 Drawing Sheets

COMPOSITES WITH ORIENTED PARTICLES AND PARTICLE NETWORKS

RELATIONSHIP TO PRIOR APPLICATIONS

This application is a Continuation-in-Part of U.S. patent application Ser. No. 10/956,753 filed Oct. 1, 2004 now abandoned and this application claims the priority and benefits of U.S. patent application Ser. No. 10/956,753 filed Oct. 1, 2004 and of U.S. Provisional Patent Application 60/508,708 filed Oct. 3, 2003, the priority and benefits of which are claimed by the above cited U.S. patent application Ser. No. 10/956,753.

TECHNICAL FIELD

This invention relates to composite materials. More specifically it relates to composite materials in which the component materials are arranged in distinct layers. Still more specifically, it relates to composite materials in which the component materials are arranged in distinct layers, and further in which a layer has oriented particles or networks of particles wherein the layering and the orientating of particles or the networking of particles impart specific structural/physical properties to the composite, including, but not limited to barrier diffusion properties, flexural rigidity, strength, and directional electrical conductivity.

BACKGROUND

Plastics in their varied formulations and applications are effectively a part of nearly every element of modern commerce, science and technology. The development and use of polymer blends and composites represent a significant advance through which desired characteristics of two or more components may be combined in a single material.

Barbee, et al., U.S. Pat. No. 6,384,121 B1, issued May 7, 2002 describe and claim nanocomposite material and products produced from such nanocomposite material. The heart of the '121 invention is a polymer-clay nanocomposite comprising three elements: a melt-processable matrix polymer, clay material that is itself comprised of solid layers, and a matrix-compatible, functionalized oligomer or polymer with an onium group. The essential layered clay material is any organic or inorganic material or mixture which is in the form of a plurality of adjacent, bound layers. The patent does not describe or anticipate layers of polymers in the composite; layering is suggested in the '121 patent only in the context of the above summarized definition of "layered clay material."

Among the various methods available to produce plastic materials, increased understanding of a new process of blending polymeric constituents of plastic composites has led to novel and improved composites and methods to produce them. Fundamental to one rapidly emerging process is the understanding that particles can be advected along complex paths in even simple flow fields, and the motion over time can become chaotic, a behavior known as chaotic advection, and, because of the newly discovered ability to control the in situ structure development, a process now referred to as smart blending. See U.S. Pat. No. 6,770,340 issued Aug. 3, 2004 to Zumbrunnen and U.S. patent application Ser. No. 10/385,118 (Zumbrunnen et al. filed Mar. 10, 2003), both of which are hereby incorporated by reference in their entirety.

SUMMARY OF THE INVENTION

A purpose of the invention is a composite wherein constituent melt materials that contain solid particle additives exist in defined layers formed in response to chaotic advection.

An additional purpose of the invention is a master batch comprising a melt-processable material and particulate matter, wherein the particulate matter is oriented in the melt-processable material or forms networks in response to chaotic advection, and wherein, prior to particle orientation or to network formation, the particulate matter may be arranged in distinct layers within the melt-processable material comprising the master batch.

A still further purpose of the invention is a composite wherein formation of layers with particles, orientation of particles in layers, or formation of networks in layers all derived from the master batch and the layer relationship between the master batch and a second melt processable material are retained in the extruded composite and in articles manufactured therefrom A still further purpose of the invention is a composite wherein a master batch with oriented particles or with particles forming networks and a second melt-processable material are formed in response to chaotic advection to give a composite with discrete layers of the master batch material and the second melt-processable material and further wherein the particle orientation or network formation initially formed in the master batch are retained in the master batch layer of the resultant composite.

An additional purpose of the invention is a composite material that reduces gas permeability while retaining suitable characteristics for various types of food product packaging.

An additional purpose of the invention is to attain a high degree of dispersal of particles. The extent of chaotic advection can be large such that said discrete layers become vanishingly thin so that particles become dispersed throughout a composite.

A sill further purpose of the invention is a composite material that displays directional electrical conductivity as may be used in plastic films in the computer/electronic components industry and in the packaging industry.

The above purposes are satisfied by a composite made of a master batch and a second melt-processable material, in which the master batch comprises a first melt-processable material and particulate material; the particulate material may be any of a variety of clay-like substances or conductive material such as carbon black; in response to chaotic advection, the clay-like particles become oriented parallel to a common plane, and the carbon black particles form networks; the orientation of the clay-like particles imparts structural rigidity and resistance to gas diffusion to the composite and the networks impart electrical conductivity to the composite; in addition, the melt-processable materials form discrete layers; the second melt-processable material may be the same as or different than the first melt-processable material. These and other benefits and objectives of the composite claimed in the invention will be better understood, appreciated, and explained by reference to the specification including the figures and appended claims.

EXAMPLES

Overview

Chaotic advection conditions can be accomplished by batch and continuous devices. A continuous flow, smart blender has proved to be very useful in the formation of a variety of composites. These machines can include stir rods which rotate periodically to generate alternating shear flows and chaotic motions in particles flowing through them. Such motions are referred to as chaotic advection and result in stretching and folding of melt domains.

In terms of particle orientation or the formation of particle networks and the general response to chaotic advection, these particles such as platelets in a masterbatch become progressively oriented as layers become thinner as chaotic advection proceeds in the smart blender. At a local level within a layer containing particles, orientation occurs in response to shear flows arising from stir rod rotations. Chaotic advection both orients and redistributes the particles among increasing numbers of layers. Clay and carbon black, although obviously very different materials, with one having a plate shape and the other being an aggregate of spherical particles, behave in similar manners. In response to chaotic advection, clay particles of a masterbatch are arranged or oriented within layers; localization of carbon black within layers can give interconnecting, electrically conducting networks of particles while adjacent layers can simultaneously inhibit electrical current flow in directions perpendicular to the layer planes.

As defined and used herein with respect to particles, the term clay is used in a broad sense and includes clay and similar, inorganic material including, but not limited to graphite and silica. Clay and such other similar materials are capable of being oriented in composites in response to chaotic advection. Carbon black is used in a broad sense and includes carbon black as well as other conductive materials in a powder-like form that may form clusters including, but not limited to nickel, iron, copper, and nanotubes. Carbon black and such other particulate materials are capable of forming interconnecting networks in composites in response to chaotic advection. Particles can vary in size from microns to nanometers. Clay particles, especially when derived from larger parent particles, tend to be thin (plate-like) so that time-varying or spatially varying shear flows that give rise to chaotic advection cause them to orient. Chaotic motions redistribute the particles volumetrically. Carbon black particles can have complex shapes as they consist of aggregates of small particles. The stretching and folding of chaotic advection localizes such particles within layers so that the resulting composites have properties characteristic of composites having smaller overall particle concentrations.

Melt-processable materials include, but are not limited to nylon, polypropylene, polypropylene-g-maleic anhydride, and linear, low density polyethylene. Additional melt-processable materials include for example other plastics and glass.

Figure 1:
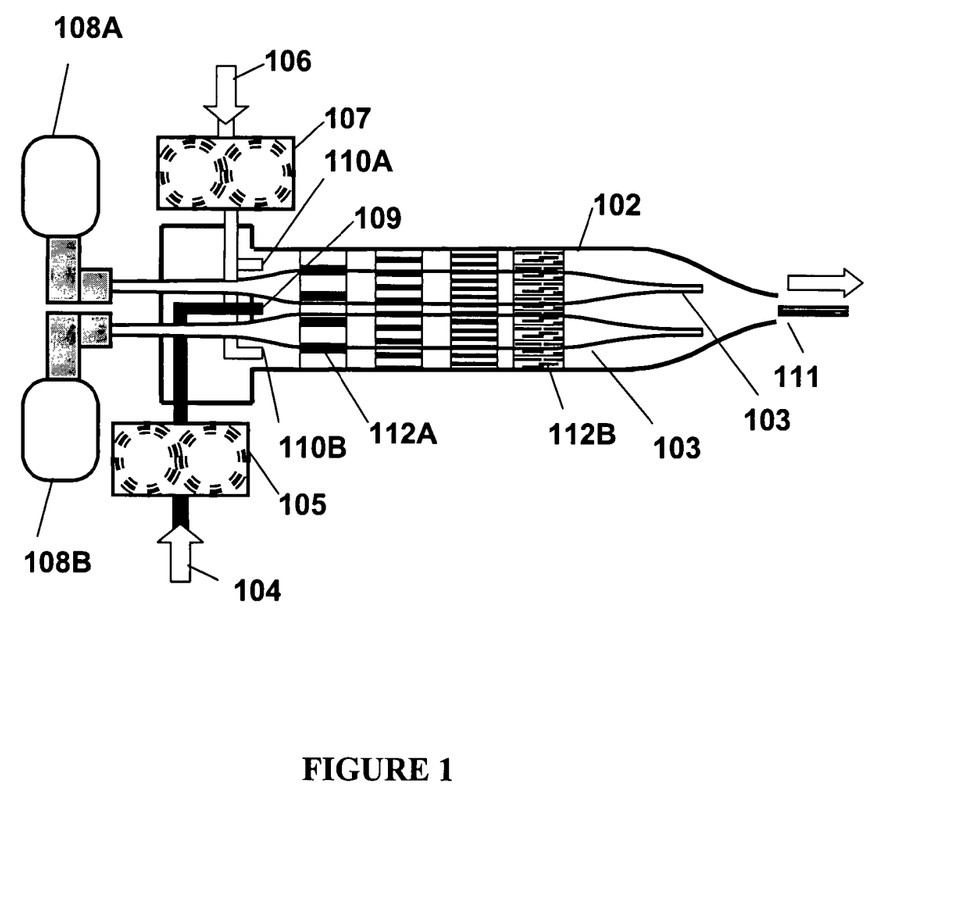
FIG. 1 is a schematic diagram of a continuous flow smart blender capable of inducing chaotic advection.

FIG. 1 illustrates the major components of a twin-rod, continuous flow smart blender device. The device 101, in a generalized, simplified configuration, comprises a barrel 102 in which conditions for chaotic advection are established and maintained. Twin stir rods 103 are positioned in the barrel. These rods 103 rotate independently, but in the same direction to instill chaotic advection. The number of rotations of the rods and the time a melt-processable material remains in the barrel (the residence time) form the basis of the extent of the chaotic advection to which the material is exposed.

Composites comprise at least two components (or melts). Commonly the more prevalent material is designated the major component (or melt), and the other, the minor component. In this invention, the major component may be a master batch comprised of a melt-processable material plus a particle material (such as clay or carbon black). There is no required, second melt-processable material, although composites with particles with and without a second, melt-processable material can be used.

The device 101 illustrates a first flow (melt-processable material) 104 being delivered via a first metering pump 105 to the barrel 102. The second flow (melt-processable material) 106 is similarly delivered by a second metering pump 107 to the barrel 102. The metering pumps provide prescribed melt flow rates of the melt processable material to the smart blender. It is understood that screw extruders or other devices with good melt flow metering capabilities can be substituted. The stir rods 103 are driven by independent motors units 108A and 108B. Rotation of the stir rods is a major factor in inducing chaotic advection. By rotating the rods sequentially and periodically and with adequate rotational displacement, chaotic advection arises.

In FIG. 1, the first flow (melt-processable material) 104 is represented by the dark segments, and it is introduced at a single point 109. The second flow (melt-processable material) 106 is indicated by light segments and introduced at two points 110A and 110B. In general, any number of introduction points can be used. The materials move through the barrel 102 and the composite is discharged at the distil end of the barrel 111. The impact of chaotic advection on progressive structuring of the composite is suggested by the simple arrangement of the two materials near the points of entry (109 and 110A and 110B) of the material compared with the more extensive structuring near the discharge point 111 as suggested by the arrangements of dark and light segments; compare 112A with 112B. Materials at the input points have been exposed to relatively little chaotic advection, and as a result the structure of the evolving composite is initially coarser as suggested by the simple arrangement of light and dark bars having large thickness at 112A. During the time the material passes from the entry points 109 and 110A and 110B, the material undergoes greater exposure to chaotic advection, and as a result a more complex and fine-scale multi-layer structure evolves, as suggested by the arrangement of the light and dark bars 112B, near the distil end 111 discharge point.

The process of chaotic advection is characterized by recursive stretching and folding of compounds in a fluid-like state. When plastics or plastic-like materials are processed, the resulting composite may develop characteristic encapsulates where layers are folded about one another as a function of the degree of exposure to chaotic advection.

A master batch comprising a melt-processable material and either clay or carbon black as herein defined can be subjected to chaotic advection. If clay is used, the particles become oriented in the melt-processable material. If carbon black is used, the particles form interconnecting networks. The degree of either orientation of the clay or network formation and interconnectivity of the carbon black particles is a function of the degree of chaotic advection to which the master batch is exposed.

In an alternative example, a second, melt-processable material may be introduced to the smart blender separately from but simultaneously with a master batch (a melt-processable material plus particles). See FIG. 1. In such examples, the particles either are oriented or form networks in the melt-processable material of the master batch, and the second, melt-processable material exists as intervening layers of material, effectively free of the particles, to give an overall multilayer arrangement. This allows, for example, production of a composite with nano-scale layers that are alternately electrical conductive and non-conductive, or composites with many internal layers having aligned platelets for low permeation plastic materials. This layered organization is found even when the second, melt-processable material is the same material as the melt-processable material of the master batch.

The extent of particle orientation and particle network characteristics in a melt and processing time are related to the number (N) of chaotic advection periods which is an operational parameter of the chaotic advection blender shown in FIG. 1 and other chaotic advection blending devices. One period can comprise the separate and sequential rotation of individual stir rods that can be rotated in the same direction. Perturbation strength (u) equals the fraction of a complete rotation for each rod during one period. In the following examples, in which the continuous chaotic advection blender of FIG. 1 was used, unless otherwise noted, u=3.0. Chaotic advection was induced by the rotation of stir rods. In a preferred configuration (embodiment), rods were rotated by separate stepper motors independently controlled by a computer interface.

Example 1

The addition of inorganic materials to plastic with appropriate processing yields plastic material with high barrier properties suitable for many food packaging applications. Thin platelet structure and high frontal area and low mass diffusitivity make clay a suitable particulate material for producing composites with high barrier properties. See Okada, et al., 1997.

Figure 2A:
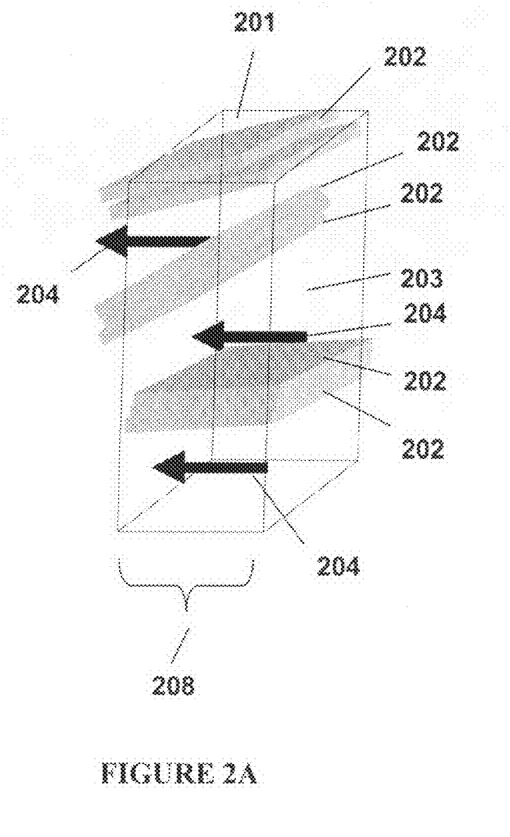
FIG. 2A diagrammatically illustrates the absence of orientation of particles in a melt-processable material.
Figure 2B:
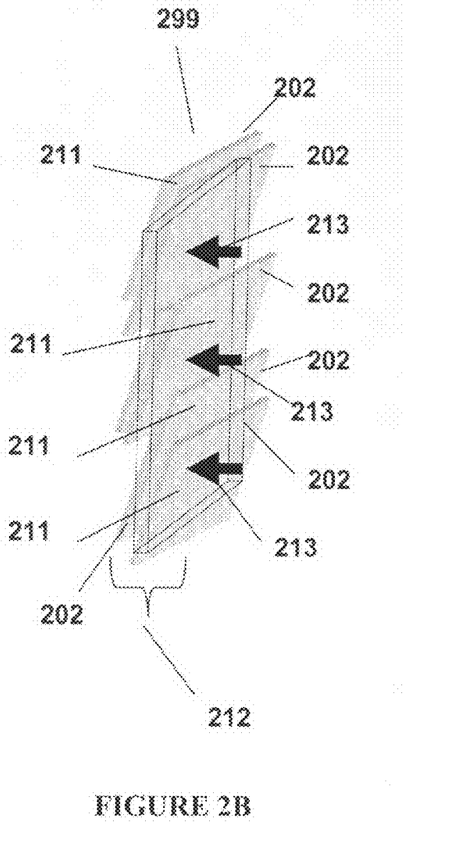
FIG. 2B diagrammatically illustrates orientation of particles in melt-processable material.

Comparing FIG. 2A with FIG. 2B illustrates how molecular diffusion is impeded by orientation of clay particles in response to smart blending based on the processes of chaotic advection. As illustrated in FIG. 2A, with conventional mixing 201 clay 202 is scattered essentially at random and not oriented throughout the volume of the plastic 203 in which it is suspended. This lack of orientation results in the persistence of numerous paths indicated by arrows 204 for permeation to occur. FIG. 2B illustrates the orientation of clay particles 299 in response to chaotic advection. The frontal dimension of the clay particles 202 is predominantly in a common plane 212 thereby impeding diffusion by blocking openings, arrows 213 (compare with FIG. 2A, arrows 204). More effective blocking in comparison to FIG. 2A occurs when the oriented platelets are laterally more distant than shown in FIG. 2B. In addition, the thickness 212 of the material with oriented platelets 299 is marked less than the thickness 308 of the non-oriented, control material. The relatively thin materials that can result are important in many packaging applications. Moreover, oriented clay particles can be provided within several distinct regions in a plastic, such as within parallel layers to impart greater resistance to permeation, for example. Layers containing oriented platelets can be thicker and more numerous in a plastic of a specific thickness. Mechanical properties such as flexural rigidity (stiffness) can also be improved by plate orientation.

Figure 3:
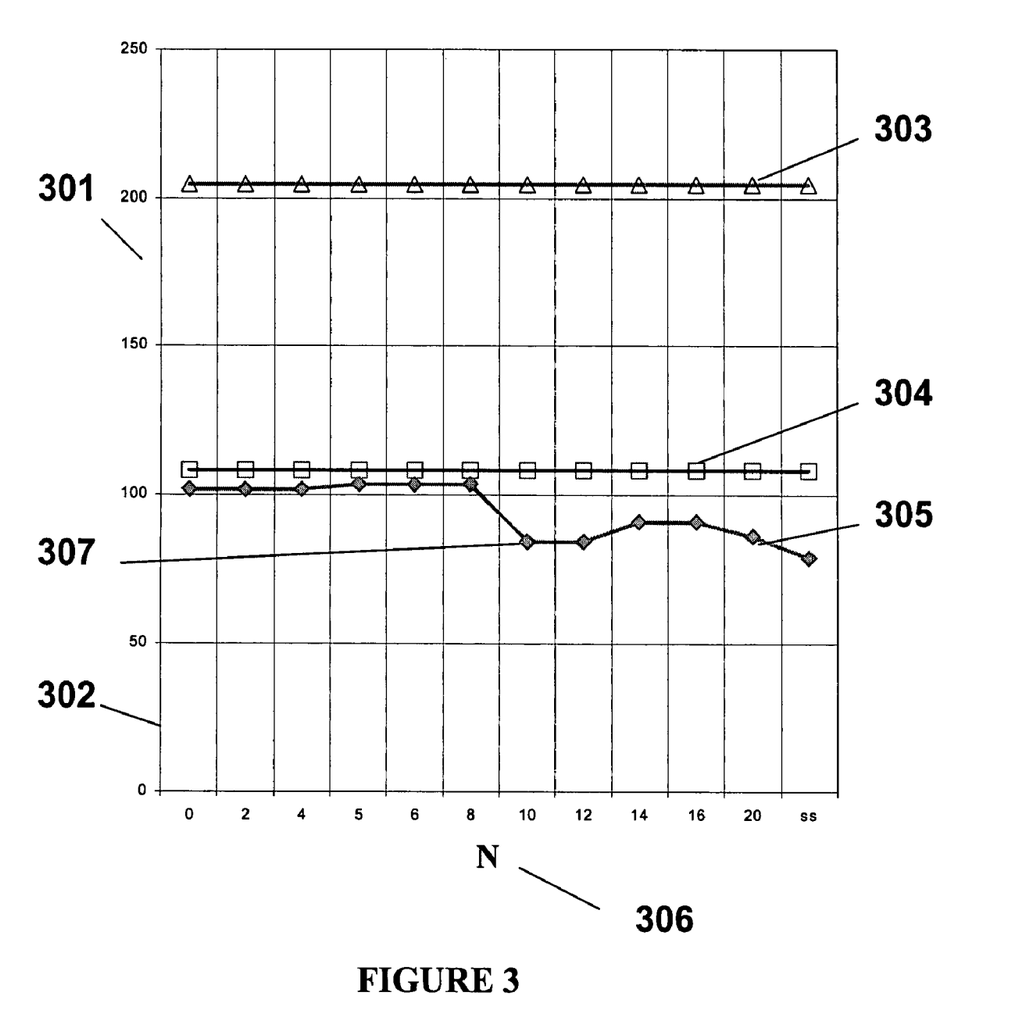
FIG. 3 shows the effectiveness of oriented clay particles in reducing the oxygen permeability in polypropylene-clay composites and also the oxygen permeability of pure polypropylene.

FIG. 3 illustrates both the effect of the inclusion of clay particles within a plastic and the effects of the extent of blending of a mixture of plastic and clay particles of oxygen permeability 301 indicated on the vertical axis 302 in units of cc.mil/100 in$^2$ day for the control, pure polypropylene, PP, 303, for PP with clay particles added and conventionally blended by twin screw extruder process 304 and for PP with clay particles added 305 and the mixture subject to various degree of chaotic advection reflected by N 306, a parameter related to stir rod motion in the smart blender, which ranges here from N=O to N=22 on the horizontal axis 306

The obvious effect of the inclusion of the oriented clay particles on permeability is seen in the comparison of the PP 303 and with the PP and clay not subjected to chaotic advection blending 304 and the PP with clay particles subjected to chaotic advection blending 305. Clay particle orientation occurs as N increases. Clearly the presence of clay particles reduces permeability. The reduction in permeability resulting with blending, greater than N=8 306, demonstrates the impact of the chaotic advection on orienting the platelets thereby pinching paths for diffusion. The reduction in permeability translates into a parallel reduction in gas (oxygen as illustrated in FIG. 3) diffusion, a significantly important property of packaging materials to the food packaging industry.

Figure 4A:
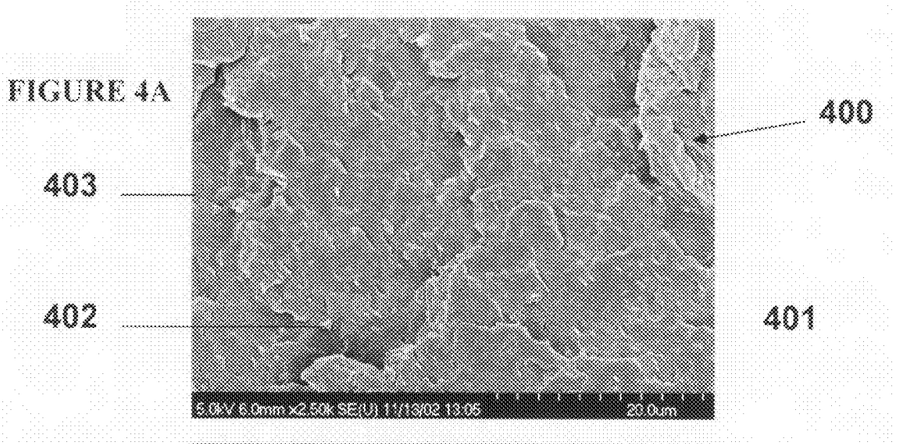
FIG. 4A illustrates a composite of clay and polypropylene that has been subjected to conventional mixing in a twin screw extruder and thereby lacks orientation in the clay particles.
Figure 4B:
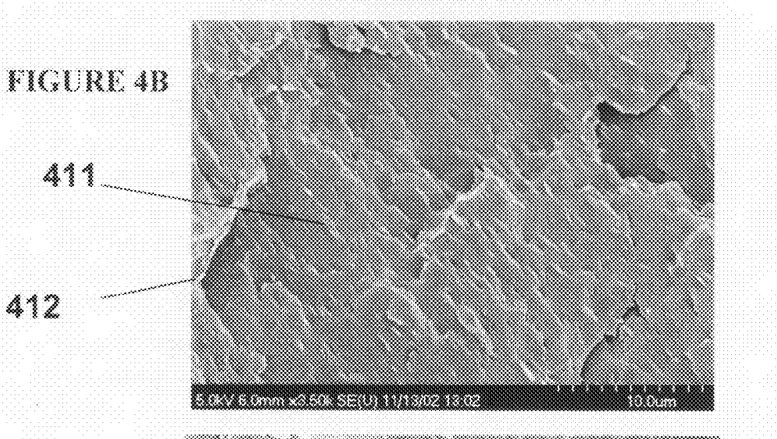
FIG. 4B illustrates the effects of chaotic advection to orient clay particles on the masterbatch also used for FIG. 4A.
Figure 4C:
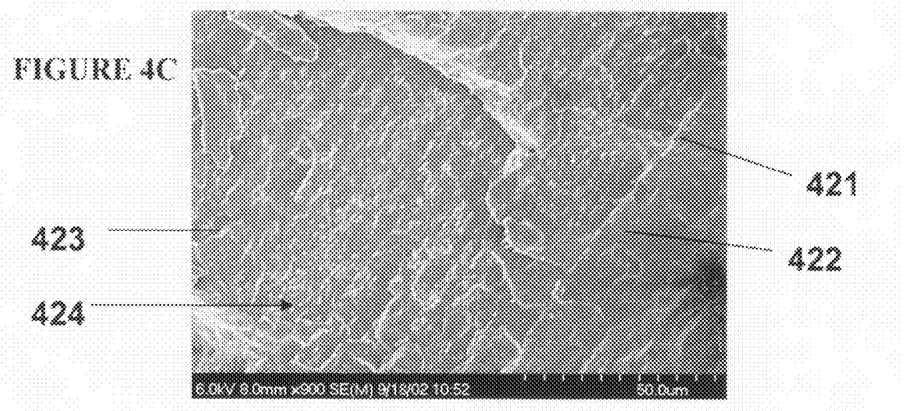
FIG. 4C illustrates an alternate composite in which clay particles are concentrated and oriented within layers adjacent to layers of the host plastic. This composite can be converted to the one in FIG. 4B by increasing the extent of chaotic advection if desired so that the masterbatch layers become vanishingly thin.

FIGS. 4A, B, and C illustrate structural arrangement of clay particles suspended in PP in response to blending. The corresponding properties are given in FIG. 3 and the related discussion. Two different starting materials were used. FIGS. 4A and 4B illustrate responses to blending using a masterbatch comprising 6% clay, 89% PP, and 5% PP-g-MA. FIG. 4C illustrates responses to blending in which PP was injected as melt-processable material (104 of FIG. 1) in a proportion of 62.5% by volume and the remaining 37.5% was a masterbatch injected as a melt-processable material (106 FIG. 1) comprising 15% clay, 72.5% PP, and 12.5% PP-g-MA. The PP-g-MA of FIGS. 4A, B, and C acts to exfoliate the clay, and other than this effect on particle size, it has no direct effect on particle orientation in response to blending that is the focus here. The masterbatch was prepared in a twin screw extruder and extruded and pelletized before chaotic advection blending at approximately 200 C.

In FIG. 4A, the composite produced by a twin-screw extruder from the masterbatch illustrates the lack of orientation that results from conventional mixing. The composite 400 has clay particles 402 randomly distributed throughout the PP 403. FIG. 4B illustrates the effects of chaotic advection, N=8, on the orientation and distribution of clay particles 411 in the PP 412 matrix. Comparing the organization of the clay particles in FIGS. 4A and 4B illustrates the effects of chaotic advection blending on the composite. The orientation of the clay platelets in FIG. 4B compared with the lack of organization evident in FIG. 4A illustrates how the clay platelets are oriented with face area in the same plane, thereby reducing gas diffusion through the plastic, as described in FIG. 2B, or improving flexural rigidity.

FIG. 4C illustrates an alternate structure where clay particles are oriented and localized in layers by chaotic advection, N=20 within multiple layers. The multilayer structure has layers containing oriented particles 421 separated by layers of PP 422 that have no particles. The particles 423 are organized in a parallel configuration 424. The extensive organization illustrated in FIG. 4C, is a result of supplying PP and a masterbatch (FIG. 4A) as separate melt streams 104 and 106 to the chaotic advection blender (FIG. 1).

Blending for the masterbatches of FIG. 4A and the novel composites of FIGS. 4B and 4C was done at 200 C.

Example 2

The inclusion of particles of electrically conductive material in a composite subjected to various levels of smart blending affects the directional conductivity of the composite. Carbon black, CB, has been used as the conductor material. One skilled in the art recognizes that the phenomenon associated with CB in the composite extends to those materials included in the definition above of carbon black. An important, unique property is particles that are oriented or placed into networks in a continuous chaotic advection process are retained in a useful orientation or network configuration in the extrusion.

Figure 5:
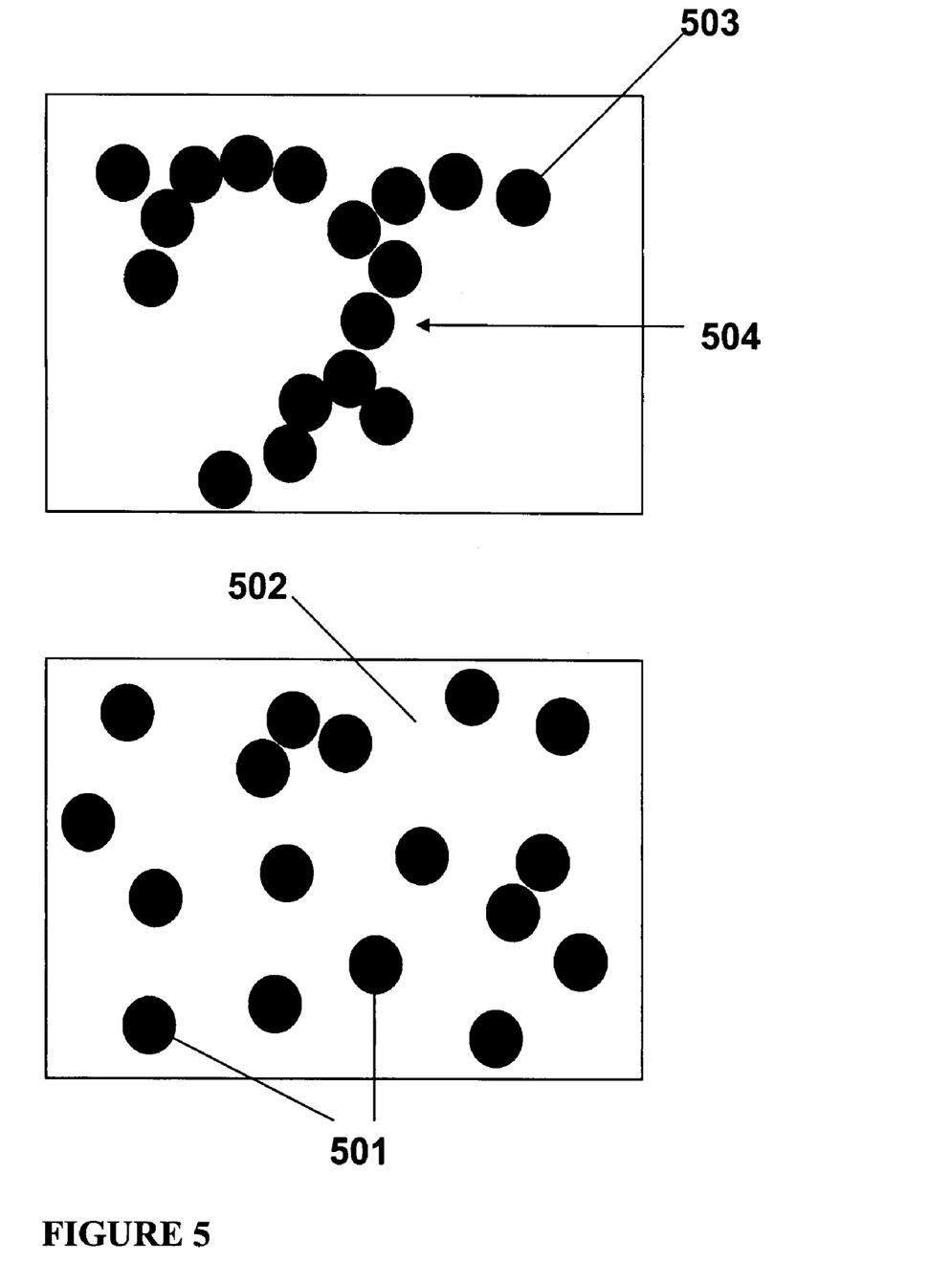
FIG. 5 compares randomly distributed carbon particles to those formed into a network in a plastic by localizing particles within layers resulting from chaotic advection.

FIG. 5 illustrates the typical distribution of CB particles 501 in a plastic 502 subjected to conventional mixing contrasted with the distribution of carbon black particles 503 in the same type of plastic 502 following exposure to chaotic advection blending. The CB particles 503 form characteristic networks 504 in response to chaotic advection.

Figure 6A:
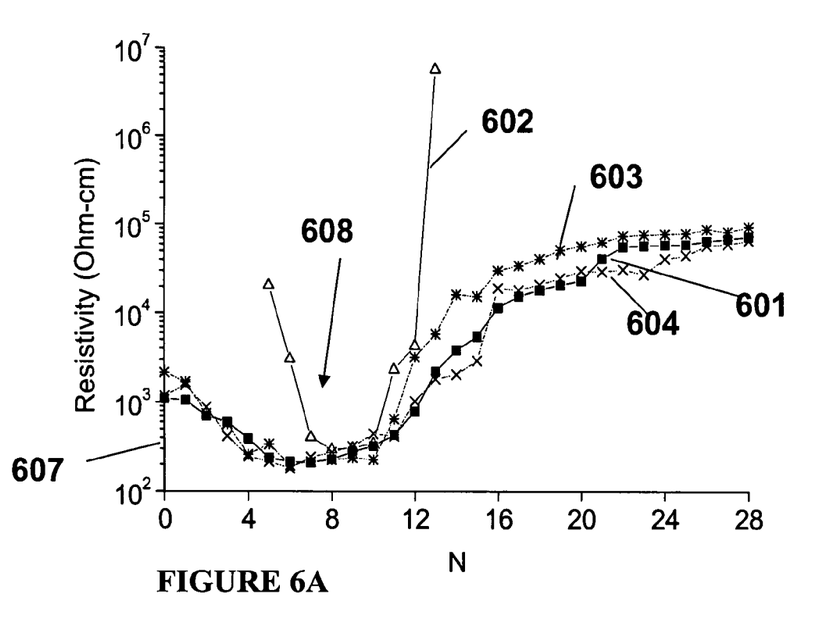
FIG. 6A illustrates ability to impart directional conductivities to an extruded plastic with carbon black added in response to the extent of chaotic advection.
Figure 6B:
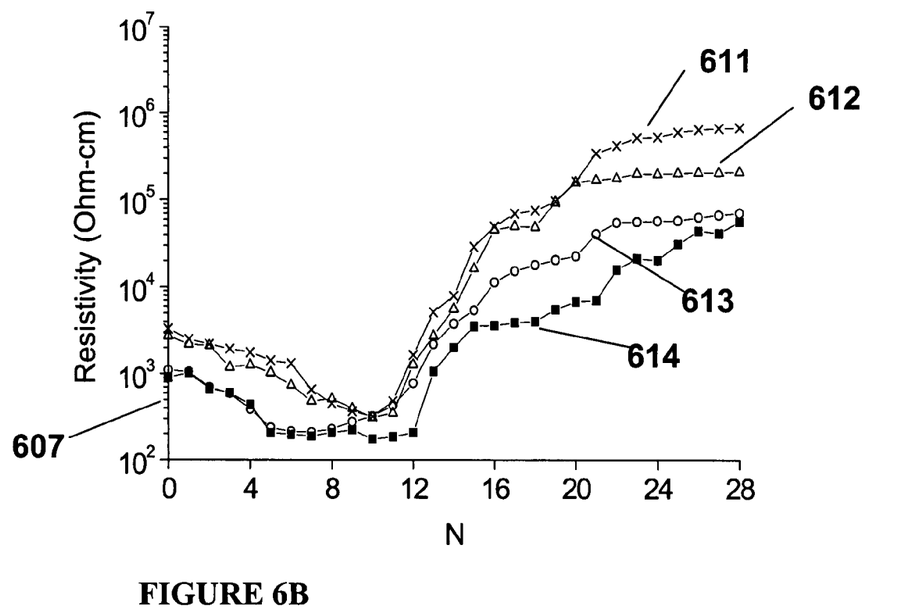
FIG. 6B illustrates impact of amount of carbon black on electrical conductivity of an extruded plastic in response to the extent of chaotic advection.

The organized distribution (network formation) of CB in the composite affects a variety of directional electrical properties of extruded composite films, FIGS. 6A and 6B. Conductivity, measured by resistivity 607, of the composite film for machine (extrusion) direction 601, cross (or transverse) direction of the composite 602, left side of the film in machine direction 603, right side of the film in the machine direction 604, are illustrated in FIG. 6A for smart blending conditions 606 ranging effectively from N=0 to extreme blending, N=28. The general pattern 607 illustrated for all measures is similar with resistance higher (measured as Ohm-cm) for no blending (N=0) to smaller for increased blending (N=8) and higher for substantial blending (N=12 to N=28). This pattern of percolation (the sudden onset of conduction by a sudden drop in resistivity) and a novel reverse percolation (the sudden increase in resistivity) provide potential composites with specific festivities, directional resistivities, and resistivity dependency. The most dramatic response 608 is apparent in the transverse (side to side) dimension of the film, demonstrating that differing directional resistivities can be imparted to extrusions via selection of a value of N when operating a smart blender.

Resistivity can be affected less by percent CB in the composite than by the degree of blending, due in great part to the effects of the networks formed. FIG. 7B illustrates the response of four composites with CB weight concentration of 1.5% 611, 2.0% 612, 2.5% 613 and 3.0% 614 with each composites subjected to blending from N=0 to extreme blending N=28. Resistivity is indicated on the vertical axis 615 and the extent of chaotic advection (N) on the horizontal axis 616. Generally, the highest percent CB 614 resulted in the lowest resistivity 615. As apparent in FIG. 6B, for amounts of CB ranging from 1.5% to 3.0%, the highest resistance is at N=28. As in FIG. 6A, resistivity attains constant values at the largest N. This occurs because structured features formed by chaotic advection are similar in size to the CB particles so networks become indistinguishable from random distributions (501 FIG. 5). Such composites resemble and have properties similar to those resulting from conventional mixing. For the low CB concentrations in FIGS. 6A and 6B, with conventional mixing, only non-conducting composites are attainable, i.e., those having a high resistivity. In contrast, any of the directional resistivity values are attainable by chaotic advection by selection of N.

Figure 7A:
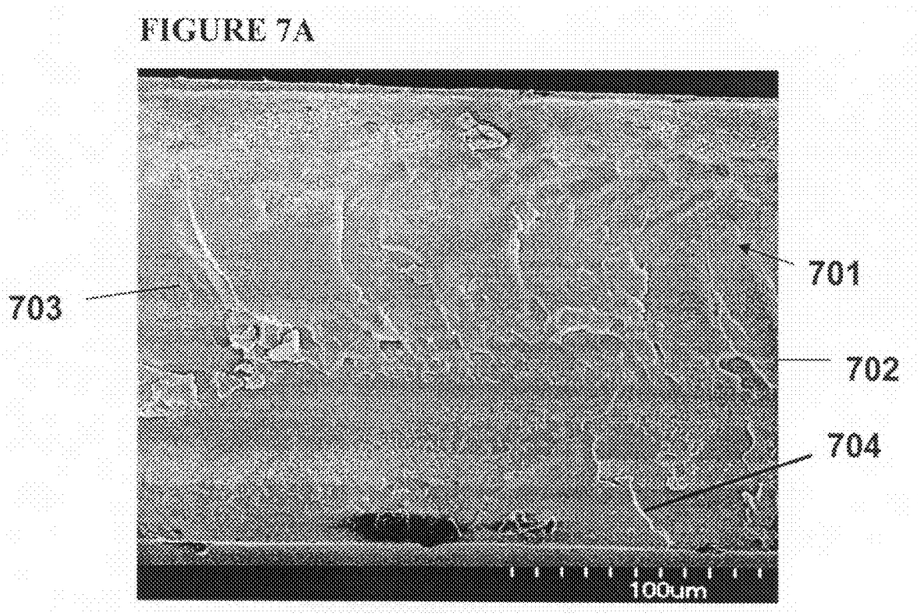
FIG. 7A is a micrograph where organization of carbon black particles into Networks is documented in an extruded plastic in response to chaotic advection.
Figure 7B:
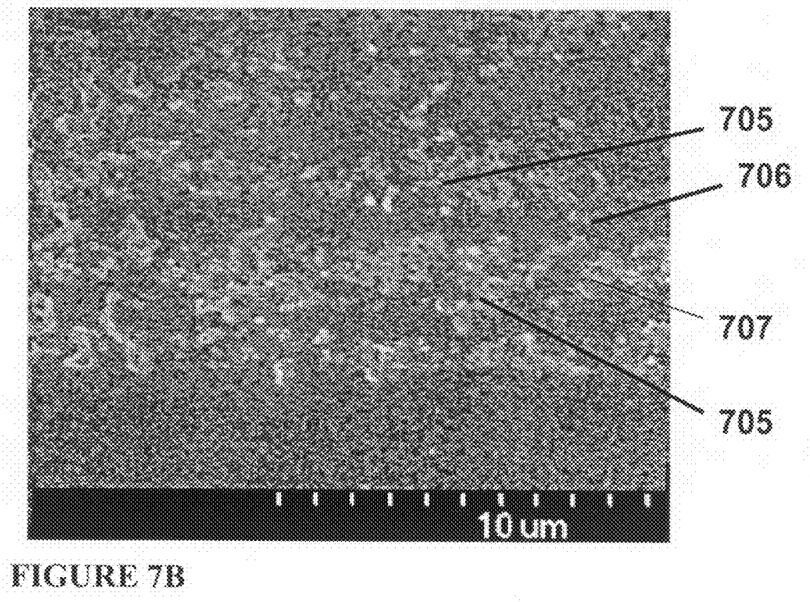
FIG. 7B provides details on the organization of FIG. 7A.

The arrangements of CB particles into networks and connecting branches which instill directional electrical properties are illustrated in FIG. 7A. By controlling the smart blending process in terms of N and selecting CB concentrations, the extent of interconnection among forming networks can be controlled to selectively impart directional electrical properties as in FIG. 7A. The carbon black particles 701 suspended in the plastic 702 reveal clear networks 703. The larger structures 704 are fractures resulting from sample preparation for microscopic study and are not part of the composite. FIG. 7B is an exploded (10x-increase) view of the composite of FIG. 7A. Interconnections among networks 705 by particles 706 are visible. The interconnecting particles of the carbon black and parallel networks 707 are the basis for the observed low resistivity and directional resistivities. The composites of FIGS. 7A and 7B included 3% by weight carbon black (Printex XE-II, Degussa, Inc., Akron, Ohio) suspended in linear low-density polyethylene (LLDPE Dowlex2517, Dow Chemical Company, Midland, Mich.).

Similar results were achieved with CB concentrations of about 1.5% to about 6.5% by weight. Processing temperatures ranged from about 175 C to 220 C. Film edges of extruded films from the smart blender were removed before resistivity measurements were done in accordance with standard procedures. Similar results are anticipated with other particulate, conductive material, including, but not limited to nickel, copper, and iron.

Example 3

Figure 8:
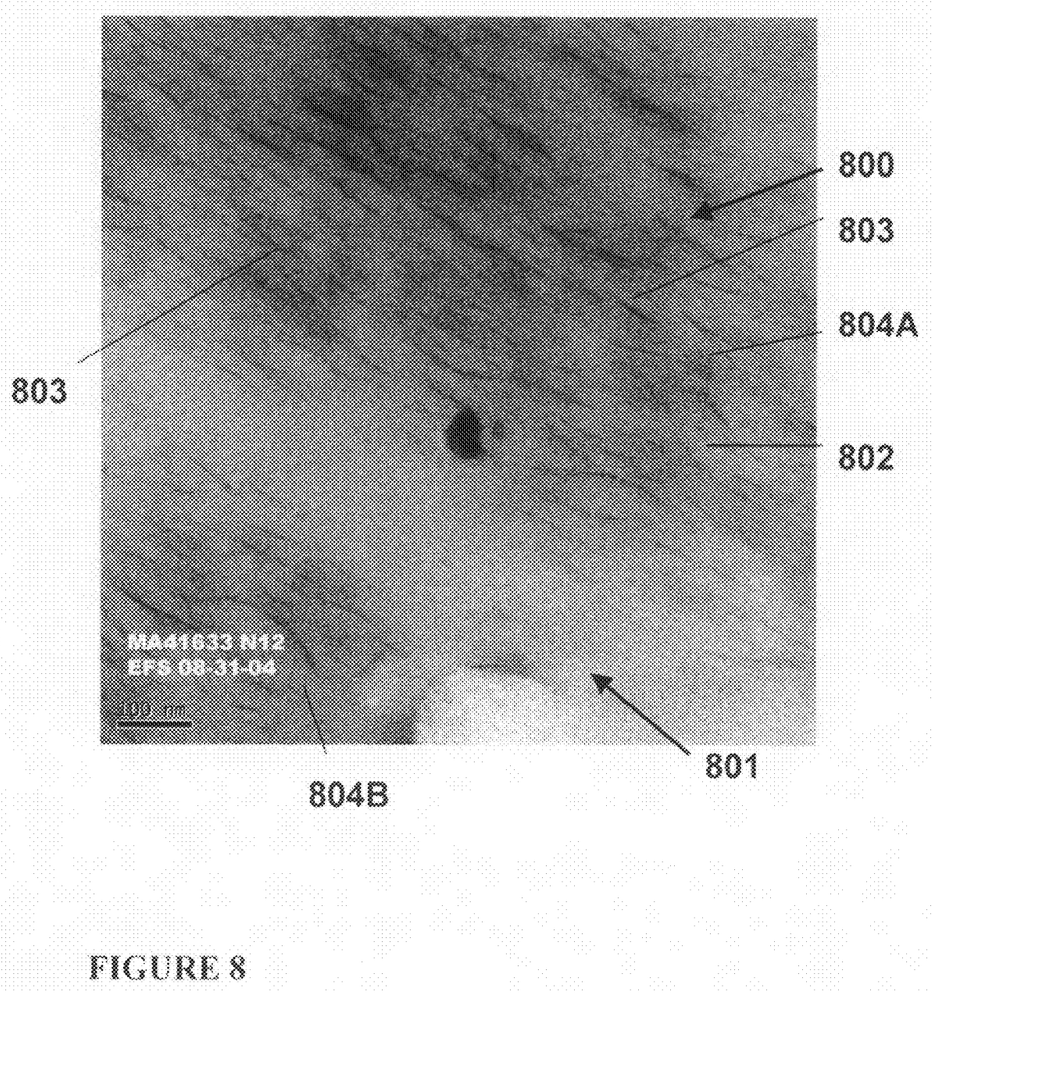
FIG. 8 is a micrograph showing orientation in a nanocomposite of clay nano-platelets in which polyamide is the melt-processable material and also adjacent layers of a second melt-processable material consisting of polyamide and clay nano-platelets referred to as the masterbatch.

FIG. 8 illustrates a composite having multilayers of nanoscale thicknesses where alternating layers have oriented clay platelets. This example illustrates that very fine-scale composites with hierarchical layered structure can be formed by chaotic advection blending. Due to the very high magnification, only a few layers are shown. The composite consists of a first melt-processable material (nylon) of a masterbatch 802 with clay material arranged and oriented in discrete layers 804A and 804B separated by a layer 801 second melt processable material (nylon, but which could be any other melt-processable plastic, glass, or other melt-processable substance). The nylon/clay particle masterbatch, with a clay concentration of 4% by weight and nylon second melt-processable material were introduced in equal proportions into a chaotic advection device as described in association with FIG. 1. The nanocomposite was extruded as 150 micron thick films so several hundred similar internal layers existed. The illustrated composite is the product of chaotic advection with N=12.

Example 4

As one skilled in the art recognizes, the basic properties and technology described in Example 1 and Example 3, above, also affect thermal; stiffness, and strength properties of composites. It is widely recognized that similarities in transport mechanisms for electrical conductivity and thermal conductivity exist. Stiffness and strength of composites is known to depend on the orientation of solid materials in the matrix. Chaotic advection blending can impart improvements to these properties in comparison to conventional mixing where particles are distributed volumetrically and disoriented in lieu of being localized and oriented. It is known that composites of various types such as fiberglass carbon fiber composites, laminates, and the like derive property improvements by localizing materials within the overall composite construct. Similarly for chaotic advection blending, by localizing particles in multilayers, forming networks, and orienting particles, overall particle concentration can be less for a level of property improvement in comparison to where particles volumetrically distributed.

In the interest of clarity and precision, specific terms and conditions have been presented in the figures and examples. Such limited terms and conditions are used to aid in understanding and to appreciate more fully the scope and intent of the invention, not as limitations in the interpretation of the following, appended claims which are applications to particles having similar processing characteristics.

What I claim is:

1. A composite of extruded character comprising a melt-processable material and oriented particles dispersed within said melt-processable material, said particles oriented substantially in a common orientation within defined discrete layers in said melt-processable material, such that the layers with the oriented particles are separated by intermediate layers of said melt processable material and wherein said oriented particles impart certain physical attributes to said melt processable material including rigidity, strength and increased resistance to gas diffusion.

2. The composite of claim 1, wherein said oriented particles are clay.

3. A composite of extruded character comprising a melt-processable material and particles dispersed within said melt-processable material, said particles forming interconnecting networks disposed within defined discrete layers in said melt-processable material, such that the layers with oriented particles are separated by intermediate layers of said melt processable material and wherein said network forming particles impart directional electrical conductivity to said composite.

4. The composite of claim 3, wherein said network forming particles are carbon black.

5. A composite of extruded character comprising a master batch said master batch comprising a first melt-processable material and particulate matter comprising a plurality of particles disposed within the first melt-processable material and said composite further comprising a second melt-processable material, wherein said master batch and said second melt-processable material are arranged in discrete layers wherein the particles are disposed substantially in a common orientation within defined discrete layers consisting essentially of the masterbatch separated by intermediate layers of said second melt processable material.

6. The composite of claim 5 wherein said second melt-processable material is the same as said first melt-processable material.

7. The composite of claim 6 wherein said particulate matter is clay.

8. The composite of claim 6 wherein said particulate matter is carbon black.

9. The composite of claim 5 wherein said second melt-processable material is not the same as said first melt-processable material.

10. The composite of claim 6 wherein said particulate matter is clay.

11. The composite of claim 6 wherein said particulate matter is carbon black.

\* \* \* \* \*